United States Patent [19]

Azarevich et al.

[11] Patent Number: 4,805,431
[45] Date of Patent: Feb. 21, 1989

[54] CONTRIVANCE FOR THE CUTTING-DEFORMING OF CYLINDRICAL SURFACES

[75] Inventors: Gennady M. Azarevich; Boris I. Akimov; Elena V. Kirsanova-Belova, all of Moscow, U.S.S.R.

[73] Assignee: Nauchno-Proizvodstvennoe Obiedinenie Po Tekhnologii Tractornogo I Selskokhozyaistvennogo Mashinostroenia NPO Nii Tractoroselkhozmash, Moscow, U.S.S.R.

[21] Appl. No.: 71,087
[22] Filed: Jul. 8, 1987
[51] Int. Cl.[4] .............................. B23B 5/00
[52] U.S. Cl. .............................. 72/70; 82/20
[58] Field of Search ............... 82/20; 408/203.5, 206, 408/223, 224; 72/70, 71

[56] References Cited

U.S. PATENT DOCUMENTS 2,940,348  6/1960  Lindemann .............................. 82/20
4,393,675  7/1983  Azarevich et al. ...................... 72/71

FOREIGN PATENT DOCUMENTS 3523618  1/1978  Fed. Rep. of Germany .......... 82/20

OTHER PUBLICATIONS

"Hegenshaidt", FRG Machine Tools-86.

*Primary Examiner*—Lowell A. Larson
*Attorney, Agent, or Firm*—Fleit, Jacobson, Cohn & Price

[57] ABSTRACT

A contrivance for the cutting-deforming of cylindrical surfaces comprises a housing wherein are installed in succession a head with at least two deforming rollers and a tool-holder adapted for movement in a plane perpendicular to the direction of a longitudinal feed. The tool-holder has an opening for passing a workpiece to be machined and accommodates a main pair of cutting tools and at least one additional pair of cutting tools. The cutting tools of the main pair are disposed oppositely in relation to a cylindrical surface under machining and in one plane with the deforming rollers. The deforming rollers are disposed relative to the cutting tools of the additional pair at a distance not multiple of a distance between the main and additional pairs of cutting tools equal to 0.1–1.5 of the value of a set-up size of the cutting tools of the main pair. The nose of one cutting tool is displaced relative to the nose of the other cutting tool of the same additional pair by a value not exceeding the radius of the cutting edges of the cutting tools of this additional pair.

1 Claim, 1 Drawing Sheet

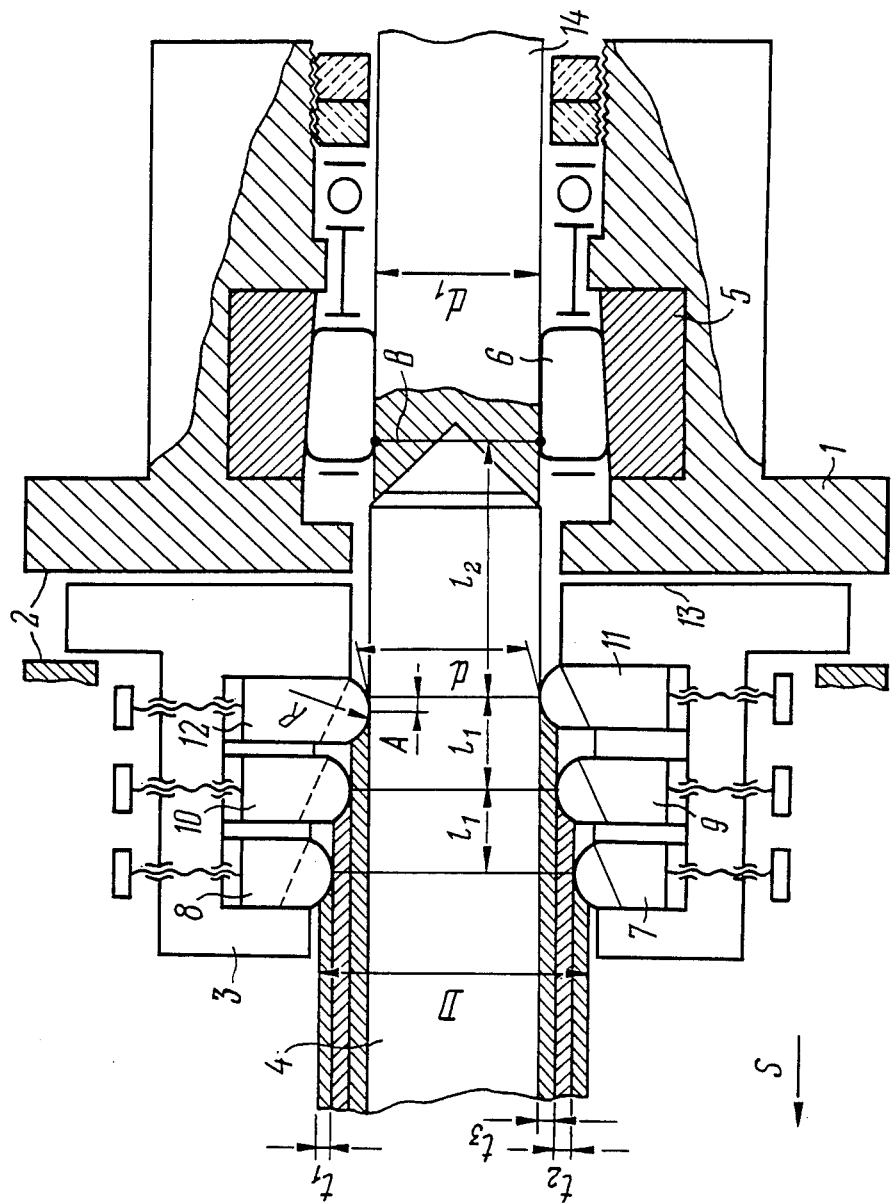

CONTRIVANCE FOR THE CUTTING-DEFORMING OF CYLINDRICAL SURFACES

FIELD OF THE INVENTION

The present invention relates to metal working and is more specifically concerned with contrivances for the cutting-deforming of cylindrical surfaces.

The proposed contrivance may be used in all branches of mechanical engineering for machining external and internal cylindrical surfaces of parts requiring comparatively high accuracy and surface quality.

BACKGROUND OF THE INVENTION

Known in the prior art are contrivances for combined machining of internal cylindrical surfaces with a double-tool "floating" block and a multiple-roller planetary deforming head. These contrivances make it possible to machine the cylindrical surfaces with comparatively high accuracy and quality of machining only using comparatively precise blanks having permissible variations of the stock to be removed not exceeding 0.1–0.15 mm ("Hegenshaidt", FRG, Machine Tools-86).

The use of such known combination contrivances involve a preliminary machining of the external surface of a part which complicates the manufacturing process and makes it more labour-intensive.

Also known in the prior art is a contrivance for the cutting-deforming of external cylindrical surfaces in a housing whereof there are arranged in succession a head with deforming rollers and a tool-holder. The tool-holder is installed in the housing for movement ("floating") in a plane perpendicular to the direction of a longitudinal feed. The tool-holder has an opening for passing a workpiece to be machined and one pair of cutting tools are secured therein with the noses thereof disposed oppositely in relation to the cylindrical surface of a part under machining (U.S. Pat. No. 4,393,675).

The contrivance described hereinbefore makes it possible to machine the external cylindrical surface of a part with a comparatively high productivity at the expense of a comparatively high rigidity of the tool-holder. However, the cylindrical surfaces of machine parts machined by means of this contrivance suffer from waviness which is not to be tolerated in the machining of cylindrical surfaces of the parts the accuracy and surface quality of which should meet stringent requirements.

Waviness results from variations in the value of the stock removed by the oppositely arranged cutting tools caused by a change in the position of the axis of rotation of the workpiece being machined and also by increasing friction and inertia forces obstructing the radial displacement ("floating") of the tool-holder.

In a number of cases after machining by the cutting action the workpiece, for example, a shaft comprises cylindrical sections of the equal diameter and correct shape but with the axes of symmetry displaced relative to one another. When such sections of the shaft are subjected to a superficial plastic deformation accomplished by the deforming rollers the latter smooth out the surface microroughness, follow the defects and in case of resonance effects occurring when the deforming rollers pass over each transition section of the shaft they increase the waviness.

Besides, the design embodiment of the tool-holder fails to ensure the maximum stability thereof relative to the cylindrical surface under machining. The maximum stability of a tool-holder is understood as a positional stability of a size-forming tool (roughing, for example) relative to the axis of rotation of the lathe spindle under any adverse conditions occurring in the process of machining the cylindrical surfaces by the cutting and superficial plastic deformation, and including:

variations in the depth of cutting accomplished, for example, by roughing and finishing tools;

nonstraightness of the axis of a workpiece under machining;

variations in the relative position of the axis of a rest-deforming head and the axis of rotation of a workpiece under machining.

SUMMARY OF THE INVENTION

It is an object of the present invention to provide a comparatively high quality of the machining of cylindrical surfaces without any waviness thereon.

These and other objects of the invention are accomplished by that in a contrivance for the cutting-deforming of cylindrical surfaces in a housing whereof there are installed in succession a head with at least two deforming rollers and a tool-holder adapted for movement in a plane perpendicular to the direction of a longitudinal feed, wherein an opening for passing a workpiece to be machined is made and a main pair of cutting tools are secured with the noses thereof disposed in one plane oppositely in relation to the cylindrical surface under machining, according to the invention, the tool-holder is provided with at least one additional pair of cutting tools disposed oppositely to each other in relation to the cylindrical surface being machined and in one plane with deforming rollers arranged relative to the cutting tools of the additional pair at a distance not multiple of a distance between the main and additional pairs of the cutting tools equal to 0.1–1.5 of the value of a set-up size of the cutting tools of the additional pair, the nose of one of the cutting tools being displaced relative to the nose of the other cutting tool of this additional pair by a value not exceeding the value of a radius of the cutting edges of the cutting tools in this additional pair.

A contrivance for the cutting-deforming of cylindrical surfaces embodied according to the invention makes it possible to improve the stability of the tool-holder relative to the cylindrical surface under machining and to ensure a comparatively high quality of the cylindrical surface without any waviness thereon.

BRIEF DESCRIPTION OF THE DRAWING

The invention will now be described in greater detail with reference to a specific embodiment thereof, taken in conjunction with the accompanying drawing diagrammatically illustrating a contrivance for the cutting-deforming of cylindrical surfaces having a tool-holder provided with two additional pairs of cutting tools.

DETAILED DESCRIPTION OF THE INVENTION

A contrivance for the cutting-deforming of cylindrical surfaces comprises a housing 1 with guides 2. Installed in the guides 2 is a tool-holder 3 adapted for movement in a plane perpendicular to a longitudinal feed S and provided with an opening for passing a workpiece 4 to be machined. The contrivance comprises a head 5 with at least two deforming rollers 6 arranged in one housing 1 with the "floating" tool-holder 3 disposed behind the latter in the direction of the longitudinal feed S.

The tool-holder 3 accommodates a main pair of cutting tools 7, 8 for a rough machining of the workpiece 4 and also two additional pairs of cutting tools 9, 10 and 11, 12 for a finish machining of the workpiece 4. The cutting tools 9, 10 and 11, 12 of the additional pairs are installed in succession one after another in one plane with the cutting tools 7, 8 of the main pair between the latter and the deforming rollers 6 disposed in this plane. The noses of the cutting tools 7, 8 and 9, 10 and 11, 12 of the main and additional pairs are respectively installed oppositely in relation to the surface of the workpiece 4 under machining.

A distance $l_1$ between the adjacent pairs of the cutting tools 7, 8 and 9, 10 is taken to be equal to 0.1–1.5 of the value of a set-up size of the finishing cutting tools 11,12 of the last additional pair. Though it is apparent to those skilled in the art the term "set-up size" used herein is to be understood as a distance between the noses of the cutting tools 11, 12 of the last pair which is equal to a diameter d of the finally finished workpiece 4. The limits of a set-up size value of the cutting tools 11, 12 are optimum and are determined experimentally. An increase in the distance $l_1$ up to 1.5 of the value of a set-up size improves the stability of the tool-holder 3. In its turn, a rise in the value $l_1$ leads to an increase in the overhang of the cutting tools 7, 8 of the main pair from a bearing surface 13 of the tool-holder 3 which adversely affects the stability thereof. Introduction of additional pairs of the cutting tools provides additional points of support of the tool-holder 3 with the workpiece 4 under machining due to which the tool-holder assumes a stable position relative to the cylindrical surface being machined, with the result that the changes in the position of the axis of rotation of the machined workpiece 4 relative to the tool-holder 3 are obviated.

A distance $l_2$ between the plane passing through the nose of the cutting tool 12 of the last additional pair and a plane "B" passing through a working portion of the deforming roller 6 of the head 5 is not multiple of the distance $l_1$ which is required for obviating an increase of waviness on the machined cylindrical surface occurring when the working portions of the deforming rollers 6 pass over defective areas on the surface of the workpiece 4 left after the cutting.

The nose of the cutting tool 12 of the last additional pair is displaced relative to the nose of the cutting tool 11 of the same pair in the direction of the longitudinal feed S by a value "A" not exceeding the value of a radius R of the cutting edges of the cutting tools 11,12 of this additional pair. This displacement ensures a withdrawal of the contrivance to the starting position without damaging the surface of the finally machined workpiece 4.

The contrivance embodied according to the invention operates in the following way.

The contrivance for the cutting-deforming of cylindrical surfaces is set in the starting right-hand position relative to the spindle (not shown in the drawing) of a universal lathe so that the cutting tools 7, 8 of the main pair and the cutting tools 9, 10 and 11, 12 of the additional pairs, as well as the deforming rollers 6 of the head 5 are on a guide shaft 14 which serves for locating and fixing a workpiece to be machined, for example, a hydraulic cylinder rod the blank of which has a diameter D. A diameter $d_1$ of the guide shaft 14 is always less than the set-up size d of the cutting tools 11, 12 of the last additional pair. The workpiece 4 to be machined is clamped between the centers (not shown), the lubricant-coolant delivery is cut in, the spindle motor is switched on to impart rotation to the workpiece to be machined and the carriage is switched into motion to impart the longitudinal feed S to the contrivance relative to the machined workpiece 4.

The cutting tools 7, 8 of the main pair are the first to come into operation for roughing the workpiece 4 and remove a stock $t_1$, while the cutting tools 9, 10 and 11, 12 of the additional pairs pass along the guide shaft 14. Then the cutting tool 9, 10 of the additional pair come into operation and remove a stock $t_2$ after which the cutting tools 11, 12 of the last additional pair are brought into action only for smoothing out a microroughness $t_3$ on the surface of the workpiece 4 left by the cutting tools 9, 10 of the additional pair.

The superficial elastic deformation of the workpiece 4 is accomplished by the deforming rollers 6 in the well known way.

The contrivance is switched out of operation at the moment when the deforming rollers 6 depart from the machined workpiece 4; as a result, the carriage feed is stopped, the spindle motor is switched off and the lubricant-coolant delivery is cut out. The contrivance is rapidly withdrawn to the starting right-hand position, the machined workpiece 4 is released from the centers and removed from the universal lathe.

The production tests of experimental models of the contrivance for the cutting-deforming of cylindrical surfaces accomplished according to the invention, used for machining hydraulic cylinder plungers of dia. D=80 mm, $R_t$<1 μm, L=3500 mm, have reliably demonstrated a high quality of the surface without any waviness $H_w$<0.3 μm (with removal of stock t=0.6–1.1 mm) which made it possible in comparison with the prior art to reduce the labour intensity of the production by 23% on an average and to step up the productivity by 1.4 times due to the use of hot-rolled blanks in place of cold-rolled ones and elimination of the finish turning, and also due to increase of the working feed up to 2.7 mm/rev (instead of 1.8 mm/rev ensured by the prior art).

What is claimed is:

1. A contrivance for the cutting-deforming of cylindrical surfaces, comprising:

a housing;

a tool-holder installed in said housing for movement in a plane perpendicular to a direction of longitudinal feed of the contrivance:

a means for longitudial feed of the contrivance;

an opening in said tool-holder for a workpiece to be machined;

a main pair of cutting tools secured in said tool-holder and having oppositely disposed cutting noses disposed in one plane in relation to a cylindrical surface under machining;

at least one additional pair of cutting tools installed in said tool-holder and disposed oppositely to each other in relation to the cylindrical surface under machining, one of the cutting tools of this additional pair having a nose which is displaced relative to a nose of the other cutting tool of this additional pair in the direction of longitudinal feed by a value not exceeding the value of a radius of the noses of the cutting tools of this additional pair;

a head arranged in said housing in tandem with said tool-holder;

at least two deforming rollers arranged in said head; said deforming rollers disposed in relation to the cutting tools of said open additional pair at a first distance which is not a multiple of a second distance between said main and additional pairs of the cutting tools, the second distance being equal to 0.1–1.5 of a set-up size of the cutting tools of said additional pair.

* * * * *